July 1, 1941.   S. S. BERNSTEIN   2,247,543
RUBBERIZED SPRING CONSTRUCTION
Filed June 9, 1939
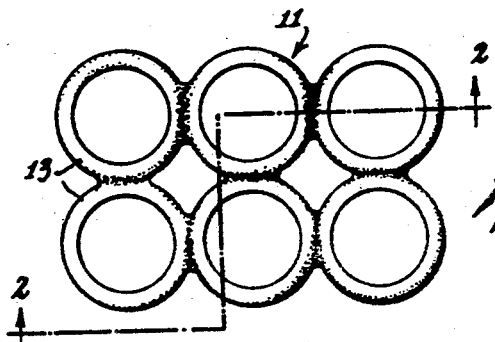
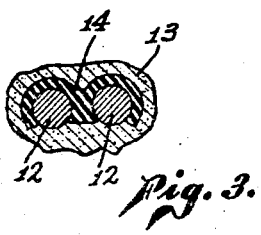
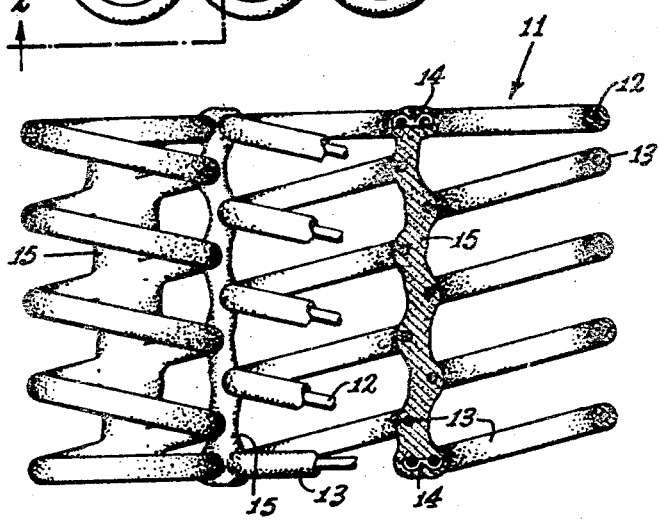
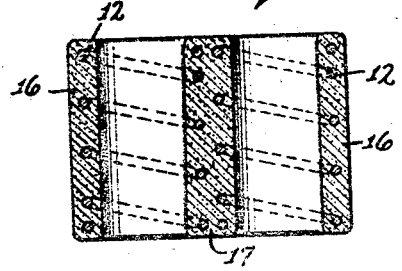
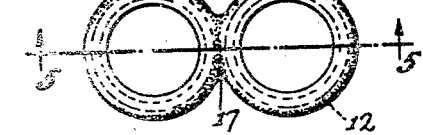
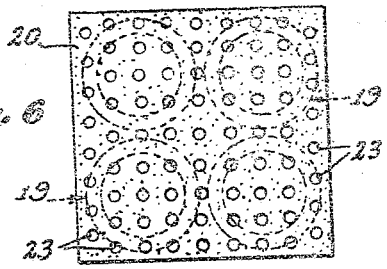
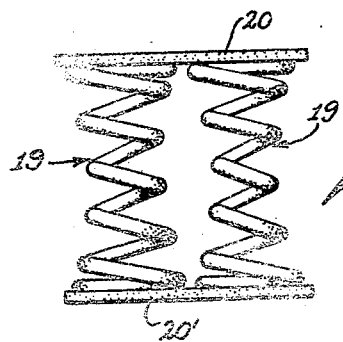
Inventor
SAMUEL S. BERNSTEIN Patented July 1, 1941

2,247,543

UNITED STATES PATENT OFFICE 2,247,543

RUBBERIZED SPRING CONSTRUCTION

Samuel S. Bernstein, Los Angeles, Calif.

Application June 9, 1939, Serial No. 278,244

2 Claims. (Cl. 5—254)

This invention relates generally to upholstery and particularly to coil springs used for providing resilient cushions or the like in upholstery construction.

It is the present practice to utilize a construction embodying spring receiving pockets made of muslin, burlap, or other material, each spring being positioned in an individual pocket in order to provide a spring construction wherein each individual spring will be maintained in its proper position relative to each other. It is also common practice to utilize springs without the pocket construction and to employ twine or the like for securing the springs in side by side spaced relation. The disadvantage of the pocket construction is that the material sometimes wears through or becomes rotted through rusting of the springs thereby permitting the springs to be forced out of their proper position, telescoping, etc., causing destruction or deformation of the furniture. It is also true that where springs are held together by twine or other fastening means the fastening means become broken or worn permitting the springs to overlap or otherwise get out of proper relation as above mentioned.

It therefore is a primary object of this invention to provide a spring construction which has the advantages of the so-called pocket construction used in the better grade of upholstery but which does not have the disadvantage of that construction or the disadvantages of ordinary means for fastening the springs together. It is a particular object of the invention to provide a spring construction whereby the individual springs are maintained in their proper side by side relation and secured together by means of a resilient and flexible material such as rubber.

It is also an object of this invention to provide a soft, quiet rubberized spring construction having the resiliency of rubber with the rebound of tempered spring steel. It is also an object of this invention to provide a construction wherein the springs are coated and protected from rust and corrosion.

These and other objects will be apparent from the drawing and the following description thereof. Referring to the drawing, which is for illustrative purposes only:

Fig. 1 is a top plan view of a group of springs embodying one form of the invention;

Fig. 2 is an elevation and section on line 2—2 of Fig. 1;

Fig. 3 is a fragmentary detailed section of the upper convolutions of adjacent springs in the region of their proximity and a clip member securing upper convolutions together;

Fig. 4 is a top plan view of another form of spring construction;

Fig. 5 is a sectional elevation on lines 5—5 of Fig. 4;

Fig. 6 is a top plan view of another form of spring construction; and

Fig. 7 is an end elevation of the spring construction of Fig. 6.

More particularly describing the invention reference numeral 11 generally indicates a group of coil springs which have been coated with a resilient flexible material such as rubber. To simplify illustration only six springs have been shown, however, it is to be understood that any number of coil springs might make up the group and that the entire group of springs is particularly designed for use in seats, mattresses and other upholstery construction where a plurality of coil springs are used.

Referring to Figs. 1, 2 and 3 the spring construction comprises a plurality of spring units each having a tempered steel helical spring 12 which is coated or covered by rubber 13. The rubber is preferably of a highly flexible, resilient and tough nature. In Fig. 2 the upper and lower coils of adjacent springs are shown joined or secured together by means of hard rubber clips 14 which serve to hold the springs in proper spaced relation. Metal clips might be used in place of the rubber clips if desired. In the region where the coils of adjacent springs are in proximity the rubber coating extends to adjacent coils of the adjacent springs and in effect forms a column 15 of rubber which serves to secure the individual springs together in side by side relation.

It is contemplated that the form of the invention shown in Figs. 1, 2 and 3 may be manufactured by the method of first securing the springs together in side by side relation by means of affixing the clips 14. A group of springs so secured together may then be dipped or immersed in liquid rubber or latex or the like. Subsequently the group of springs may be removed and the rubber cured by any of the methods normally employed in the curing of rubber.

With the construction above outlined there is formed a group of springs in which the individual springs are held together by resilient and flexible rubber so that the entire group may be employed in upholstery construction without the necessity of employing the ordinary means for securing the individual springs together. It is also true that a quiet or noiseless spring action results in the use of this spring and that the steel springs are protected against rust by the coating of rubber.

In Figs. 1-3, the individual convolutions of the springs are shown evenly coated with rubber, however it is quite possible that if the springs are to be coated by a dipping process the resulting coating may be more irregular than shown.

In Figs. 4 and 5 there is shown another form of the invention wherein the steel springs 12 are embedded in walls 16 formed of a resilient flexible and tough rubber or the like. The individual walls 16, in which each spring is embedded, are generally cylindrical in shape, however, in the region where an adjacent spring is in proximity the wall extends outwardly and becomes a part of the wall of the adjacent spring wall such as indicated by reference numeral 17.

In Figs. 6 and 7 there is shown another form of the invention wherein the coil springs are mounted between two sheets of flexible rubber. Reference numeral 19 generally indicates coil springs which have been coated with rubber. These springs may be either the type shown or the straight-sided type. Rubber sheets 20 and 20' are provided which are secured to the top and bottom of the springs respectively by means of rubber cement or other securing means. Rubberized fabric or the like might be used in place of a pure rubber sheet.

By means of this construction a plurality of spring units may be held in the desired side by side relation and may therefore be embodied in various types of upholstery construction. When the spring construction is embodied in a chair or the like the surrounding portions of upholstery may interfere with the free ingress and egress of air from between the sheets 20—21 and therefore in order to insure the free ingress and egress of air from the region between the sheets when the spring is utilized, the sheets 20—21 have been provided with a plurality of apertures 23. The holes are also designed to hold filling such as cotton or the like which may be used in upholstery construction above and below the sheets 20—21.

In all forms of the invention described, it is contemplated that the spring rubberized units may be made in long sheets and may be stocked in such sheets and that when it is desired to embody the springs in upholstery construction it will only be necessary to separate the required number of springs by cutting or otherwise parting the rubber in the desired plane.

I claim as my invention:

1. In a spring construction, a group of coil springs in which the individual springs are arranged in side by side relation, a coating of rubber covering the individual convolutions of said springs, said rubber extending to the convolutions of adjacent springs in the region where adjacent springs are in proximity and forming columns at said regions whereby said springs are joined together.

2. In a spring construction, a group of coil springs in which the individual springs are arranged in side by side relation, clips connecting and securing together said springs at their top and bottom convolutions in the region where adjacent springs are in proximity, a coating of rubber covering the individual convolutions of said springs and the connecting clips, said rubber extending to the convolutions of adjacent springs in the region where the convolutions of adjacent springs are in proximity and forming columns at said regions whereby said springs are joined together.

SAMUEL S. BERNSTEIN.